United States Patent [19]

Notohamiprodjo

[11] Patent Number: 4,628,433
[45] Date of Patent: Dec. 9, 1986

[54] CONTROL CIRCUIT FOR DIODE-OR CONNECTED POWER SUPPLIES

[75] Inventor: Hubertus S. Notohamiprodjo, Hoffman Estates, Ill.

[73] Assignee: GTE Communication Systems Corp., Northlake, Ill.

[21] Appl. No.: 814,937

[22] Filed: Dec. 30, 1985

[51] Int. Cl.$^4$ .................................. H02M 3/335
[52] U.S. Cl. ...................... 363/65; 323/272
[58] Field of Search .................. 363/65, 70, 71; 323/272

[56] References Cited

U.S. PATENT DOCUMENTS 3,824,450  7/1974  Johnson et al. ............... 323/272
4,194,147  3/1980  Payne et al. .................. 323/272

Primary Examiner—Peter S. Wong
Assistant Examiner—Judson H. Jones
Attorney, Agent, or Firm—Gregory G. Hendricks

[57] ABSTRACT

A control circuit which monitors the output voltage of multiple power supplies connected to each other in a diode-or arrangement. When one power supply provides a higher voltage than the others the control circuit causes the lower output power supplies to operate in a standby mode. The control circuit includes voltage dividers on both sides of the output diode of the power supplies. These voltage dividers provide indications of the voltage output of their associated power supply and the other power supplies. A voltage comparator monitors the output voltage of its associated power supply and the other diode-or connected power supplies as indicated by the voltage dividers. The voltage comparator to adjust the voltage output of the associated power supply to a level just below the high output power supply, thereby leaving it in a standby mode of operation. If the high output power supply provides a reduced level of output voltage the voltage comparator in the standby power supply causes that power supply to then supply power to the load without any interruption in supply of the power.

11 Claims, 3 Drawing Figures

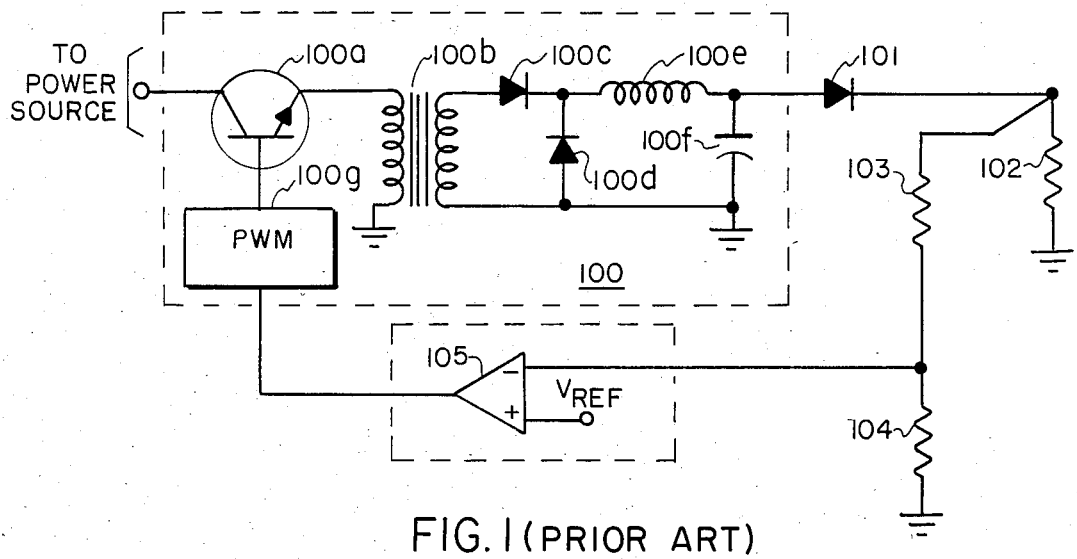
FIG. I (PRIOR ART)
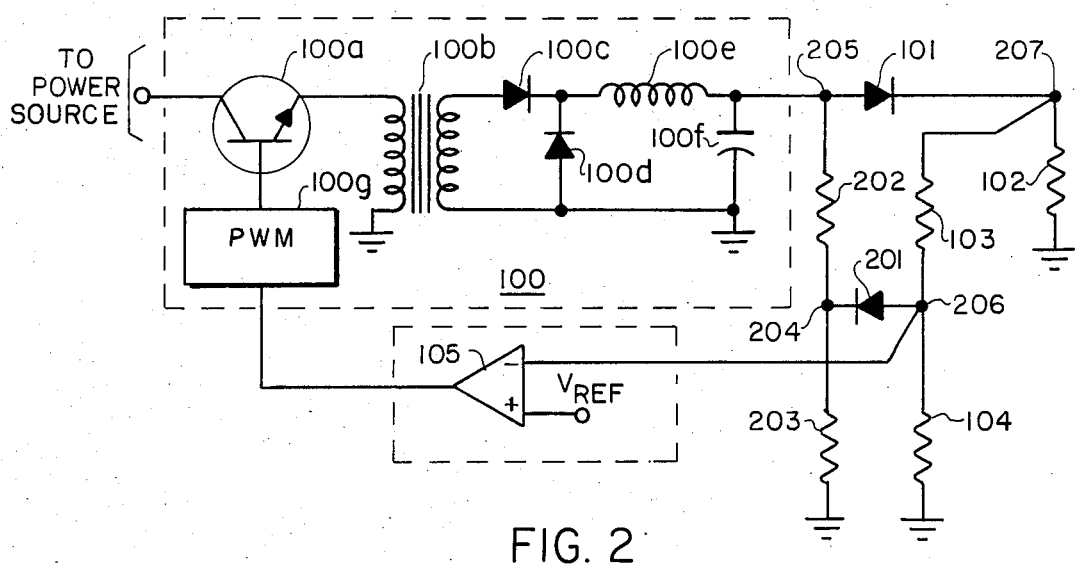
FIG. 2

CONTROL CIRCUIT FOR DIODE-OR CONNECTED POWER SUPPLIES

FIELD OF THE INVENTION

The present invention relates to power supply circuits and more particularly to a control circuit for diode-or connected power supplies.

BACKGROUND OF THE INVENTION

Two a more power supplies are often connected together in a diode-or arrangement for reliability through redundancy. The power supply providing the lower output voltage in such an arrangement is typically turned off by an error feedback amplifier when that amplifier detects a higher output voltage from another power supply. Various arrangements have been developed to prevent the low output voltage power supply from turning off when there is a small increase in output voltage from another diode-or connected power supply.

U.S. Pat. No. 3,428,820 issued to G. F. Lyon on Feb. 18, 1969 discloses an electro-responsive switching network for a system to be selectively deactivated. U.S. Pat. No. 3,736,491 issued to K. H. Kuster on May 29, 1973 discloses a D.C. to D.C. regulated current fold back power supply which limits output current in an overload state. U.S. Pat. No. 3,808,452 issued to H. F. Hutchinson on Apr. 30, 1974 discloses a power supply system having redundant DC power supplies. However, each of these patents discloses a power supply system which involves complex circuitry for sensing the output of interconnected power supplies.

The present invention provides a novel arrangement for operating diode-or connected power supplies in an active-standby arrangement through use of a novel control circuit which does not require the complex circuitry utilized in the prior art.

SUMMARY OF THE INVENTION

In accordance with the present invention a control circuit is provided for a power supply, diode-or connected in a power supply system including a plurality of power supplied each including a power switching circuit and a comparator connected to the power switching circuit and each connected to a load via an output diode. The control circuit comprises first voltage indicating means connected between the load end the output diode and it is effective to provide a first signal representative of the voltage applied to the load.

The control circuit also comprises second voltage indicating means connected between the power switching circuit and the output diode and it is effective to provide a second signal representative of the output voltage of the power switching circuit. A switching means is connected between the first and second voltage indicating means and it is operated in response to the first signal having a magnitude larger than the second signal to electrically connect the first voltage indicating means to the second voltage indicating means.

The comparator is operated in response to the first signal having a magnitude larger than a predetermined value to provide a control signal representative of the difference between the first signal and the predetermined value and the power switching circuit is operated in response to the control signal to increase its output voltage by a proportionate amount.

DESCRIPTION OF THE DRAWING

FIG. 1 of the accompanying drawing is a schematic diagram of a prior art power supply for use in a diode-or arrangement;

FIG. 2 of the accompanying drawing is a schematic diagram of a single power supply in accordance with the present invention for use in a diode-or arrangement and;

DESCRIPTION OF THE PREFERRED EMBODIMENT

Figure 3:
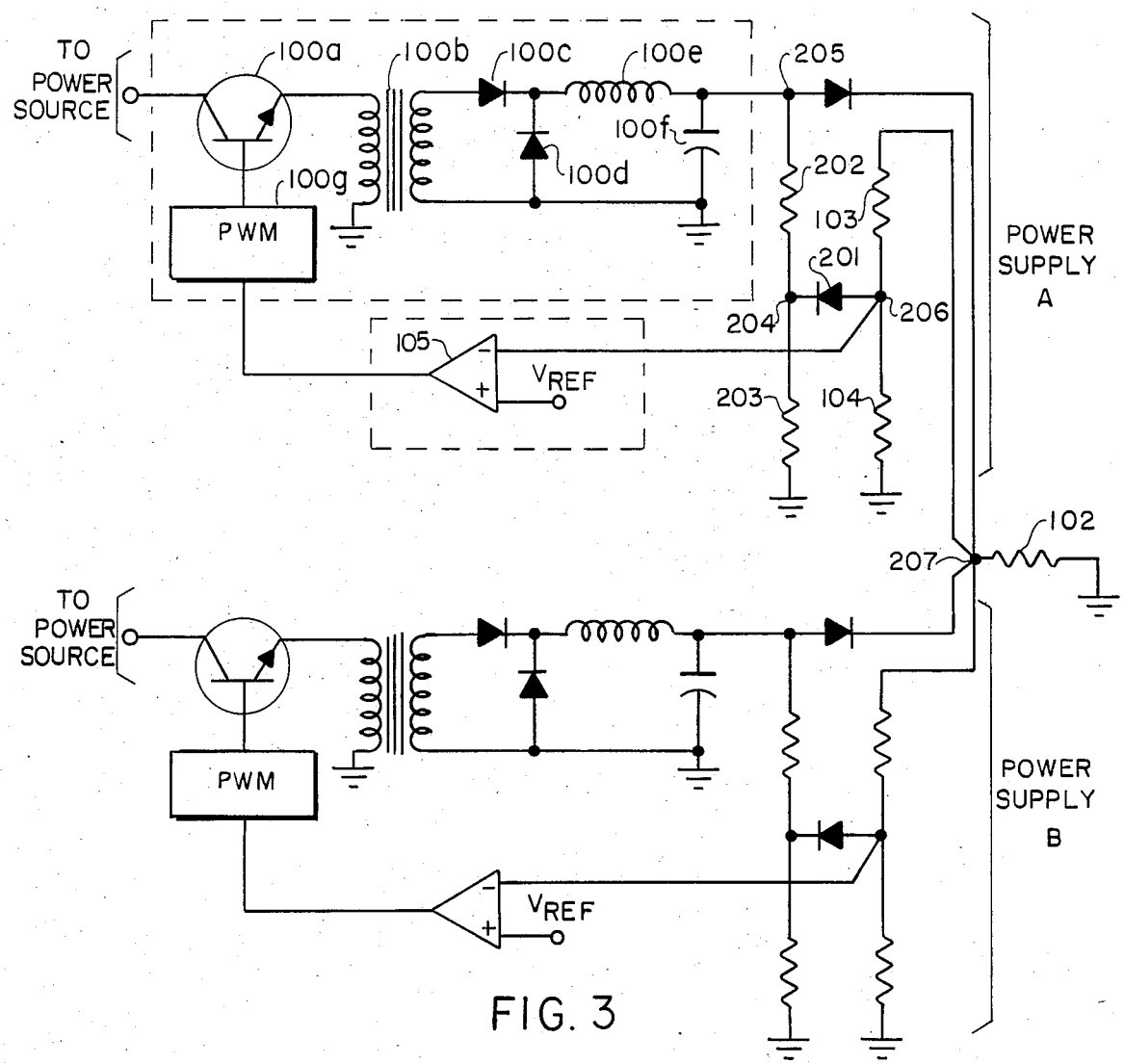
FIG. 3 of the accompanying drawing is a schematic diagram of two diode-or connected power supplies in accordance with the present invention.

When power supplies are connected together in a diode-or arrangement for reliability through redundancy one power supply may provide a higher output voltage than the other. Consequently, the power supply providing the lower output voltage turns off unless special circuitry is connected to an associated error feedback amplifier.

An example of such a power supply which turns off under these conditions is shown FIG. 1. This prior art circuit includes power switching circuit 100 which is connectable to an external power source. This power switching circuit is connected to output diode 101 which is connected to ground via load 102. Output diode 101 is further connected to resistor 103 which is connected to resistor 104 and error feedback amplifier 105. Resistor 104 is further connected to ground and amplifier 105 is connected to power switching circuit 100. This power switching circuit includes switching transistor 100a which is connected to isolation transformer 100b whose primary winding is further connected to ground. The secondary winding of transformer 100b is connected to rectifying diode 100c which is connected to the junction of protection diode 100d and filter choke 100e. This choke is further connected to the junction of filter capacitor 100f and output diode 101. Filter capacitor 100f is further connected to protection diode 100d and to ground. The positive input of error feedback amplifier 105 is connected to a voltage reference source The output of error feedback amplifier 105 is connected to the base of switching transistor 100a via pulse width modulator error 100g.

When power switching circuit 100 is connected to the external power source it provides an output voltage which is applied to load 102 via output diode 101. The output voltage appearing across load 102 also appears across voltage divider 103 and 104. The voltage appearing at the junction of resistors 103 and 104 also appears and the negative input of error feedback amplifier 105. Resistors 103 and 104 are chosen to be of a such a value as to cause the voltage appearing at the negative input of error feedback amplifier 105 to be equal to the reference voltage Vref appearing at the positive input of this amplifier. Under such conditions there is no output signal from error amplifier 105 and therefore the power provided by power switching circuit 100 remains constant.

However, when two such power supply circuits are connected in parallel across load 102 the other power supply circuit may provide an output voltage that is greater than the voltage provided to load 102 by power switching circuit 100. Error feedback amplifier 105 will then cause power switching circuit 100 to turn off. This result occurs because the higher output voltage from the other power supply appearing across load 102 also appears across voltage divider resistors 103 and 104. Consequently, the voltage appearing at the junction of resistors 103 and 104 also appears at the negative input of error amplifier 105. Since this voltage is greater than the reference voltage Vref, error feedback amplifier 105 applies a negative signal to power switching circuit 100. This power switching circuit then reduces its output voltage. However, the voltage appearing at the junction of resistors 103 and 104 continues to be greater than the reference voltage Vref to apply. Consequently error amplifier 105 continues a negative signal to power switching circuit 100 until that switching circuit turns itself off and ceases to apply an output voltage to load 102.

In order to prevent this turn-off operation when two diode-or connected power supplies provide different output voltages, a novel control circuit is been provided according to the present invention. Referring now to FIG. 2 the power supply system of FIG. 1 is shown with the addition of the novel control circuit of the the present invention. This novel control circuit includes shunt diode 201 and voltage divider resistors 202 and 203. These resistors are connected to each other and to the cathode of diode 201 via junction point 204. Resistor 203 is further connected to ground and resistor 202 is further connected to the junction of power switching circuit 100 and the anode of output diode 101 via junction point 205. The anode of shunt diode 201 is connected to resistors 103 and 104 via junction point 206. Resistor 103 is connected to load 102 and the cathode of output diode 101 via junction point 207.

Resistors 202 and 203 form a voltage divider which provides an indication of the voltage appearing at the anode of output diode 101. Similarly, resistors 103 and 104 form a voltage divider which provides an indication of the voltage appearing at the cathode of output diode 101. The impedance of resistors 103 and 104 is chosen to be much less than the impedance resistors 202 and 203. Typically, resistors 202 and 203 are twenty times greater than impednace of resistors 103 and 104. Also the ratio of resistors 103 and 104 is equal to the ratio of resistors 202 and 203. For example, resistors 202 and 203 might each have a value of 50 ohms and resistors 103 and 104 would then each have a resistance of 1000 ohms. Consequently, the total resistance of resistors 202 and 204 would equal 100 ohms and the total resistance of resistors 103 and 104 would equal 2000 ohms. The ratio of 2000 ohms to 100 ohms meets the required 20 to 1 ratio. Also, the ratio the resistance of resistor 202 to resistor 203 equals 50/50 or 1 and the ratio of the resistance of resistor 103 and 104 equals 1000/1000 which also equals 1. Shut diode 201 connects the junction point of voltage divider resistors 103 and 104 to the junction of voltage divider resistors 202 and 203. This shunt diode is a Schottky diode since such a diode provides a lower voltage drop than conventional diodes. The remaining components of the power supply of FIG. 2 are identical to and a designated the same as the corresponding components in FIG. 1.

When the power supply system of FIG. 2 is connected to the external power source, power switching 100 provides an output voltage at junction point 205. This output voltage is then applied to load 102 via diode 101. The resultant current flow through diode 101 causes it to provide a characteristic diode voltage drop across it. Therefore, the voltage at junction point 207 is lower than the voltage at junction point 205. Since the ratio of the resistance of resistor 103 to resistor 104 is equal to the ratio of the resistance of resistors 202 to resistor 203, the voltage appearing at junction point 204 is greater than the voltage appearing at junction point 206. Therefore, shunt 201 is reverse biased and consequently it is turned off.

Error amplifier 105 then senses the voltage at junction point 206 and compares it to reference voltage Vref.

The resistance of resistors 103 and 104 is chosen to represent the output voltage in such a manner as to cause the voltage at junction point 206 to equal to the reference voltage Vref. Consequently, there is typically no miscomparison by error feedback amplifier.

However, when two such power supply systems are connected to the same load in a diode-or arrangement, the control circuit comprising resistors 202 and 203 and diode 201 operate in conjunction with error feedback amplifier 105 to cause the associated power supply to operate in a standby mode when the other diode-or connected power supply provides a higher output voltage. Thus the novel control circuit of the present invention prevents the associated low output power supply from going into a turn-off mode of operation when diode-or connected power supply provides a higher output voltage. This novel control circuit then allows the associated power switching circuit to maintain itself in a standby mode of operation to ensure that there is no interruption in power output in the when the higher output power supply should cease to be operational.

Referring now to FIG. 3, two power supply systems, power supply A, and power supply B, are shown connectable to an associated power source. When these power supply systems are connected to an associated power supply they provide power at their output. The control circuit of the present invention facilitates improved redundant power supply operation by allowing the power supply providing the lower output to operate in a standby rather than a turn-off mode of operation. For example, if power supply B provides a higher output voltage to load 102 than power supply A, the control circuit of power supply A operates to cause power supply A to go into a standby mode of operation. When power supply B provides such a higher output voltage to load 102 that higher output voltage also appears at junction point 207. Consequently, a higher voltage also appears at junction point 206 as divided by voltage divider resistors 103 and 104. This higher voltage at junction point 206 then appears at the negative input of error feedback amplifier 105. This amplifier detects the miscomparison with reference voltage Vref and applies a negative error signal to power switching circuit 100. Pulse width modulator 100g detects this negative error signal and causes the pulses it applies to power switching transistor 100a to be reduced. Consequently, the output voltage from power switching circuit 100 is also reduced. Therefore, a lower output voltage appears at junction pint 205 and and junction point 204 as divided by voltage divider resistors 202 and 203.

When the voltage at junction point 204 is less than the voltage at junction point 206, Schottky diode 201 is turned on and conducts current. Therefore, resistors 203 and 104 are essentially connected in parallel. Since the resistance of resistor 203 is much less than the resistance of resistor 104 (e.g. 20 times less), the effective resistance of this parallel combination approaches the value of resistor 203. Therefore, the effective resistance of voltage divider comprising resistor 103 and in the parallel combination of resistors 203 and 104 causes a much lower voltage to appear at junction point 206.

The lower voltage at junction point 206 is then detected by error feedback amplifier 105. This amplifier compares the resultant voltage appearing at its negative input with the reference voltage Vref which is now greater than the voltage appearing at the negative input. Consequently, error feedback amplifier 105 applies a positive signal to power switching circuit 100 which then increases its output voltage. This increasing output voltage at junction point 205 causes a higher voltage to appear across resistor 203 and therefore a higher voltage also appears at junction point 206.

Error 105 feedback amplifier continues to cause power switching circuit 100 to increase its output at a decreasing rate. This increasing output voltage will continue until the voltage at function point 205 as divided by voltage divider resistors 202 and 203 causes shunt diode 204 to become almost reverse biased. As the voltage at junction point 205 increases the voltage junction 206 to increase thereby increasing the voltage at the junction point 206 increases until it equals a reference voltage Vref. When those two voltages are equal, error feedback amplifier 105 causes pulse switching circuit 100 to stop increasing its output voltage.

The voltage at junction point 206 rises to the reference voltage when the voltage from switching circuit 100 is less than the output voltage of power supply B since a lower voltage appears at junction point 206 due to the modified voltage divider ratio resulting from the parallel combination of resistors 104 and 203. As Shotkky diode 201 tends to become reverse biased its resistance increases and therefore the voltage divider ratio increases causing the voltage appearing at junction 206 to approach the reference voltage when the output voltage from power switching circuit 100 is less than the output voltage from power supply B.

Thus power supply A does not turn off but rather goes into a standby mode of operation when power supply B provides a a higher output voltage than power supply A. If power supply B were to become inoperative or to provide a lower output voltage than power supply A, then Schotkky diode 201 would become reverse biased and power supply A would simply power to load 102 without any interruption in application of power to that load.

Since power supply B contains the same circuitry as power supply A, the same principles apply to power supply B in the event that power supply A provides a greater output voltage than power supply B. While the schematic diagram of FIG. 3 shows only two diode-or connected power supplies, it is obvious that the same principles would apply to any multiple of diode-or connected power supplies.

Thus the control circuit for diode-or connected power supplies of the present invention provides a novel arrangement for ensuring that a power supply providing a lower output voltage will go into a standby mode of operation rather than a turn-off mode of operation when another diode-or connected power supply provides a higher output voltage. Consequently, there will be no interruption in power applied to a load in the event that the power supply providing the higher outward voltage ceases to provide such higher output voltage.

It will be obvious to those skilled in the art than numerous modifications of the present invention can be made without departing from the spirit of the invention which shall be limited only by the scope of the claims appended hereto.

What is claimed is:

1. A control circuit for a power supply diode-or connected in a power supply system including a plurality of power supplies each power switching circuit being connected to a load via an output diode, said control circuit comprising:
   first voltage indicating means connected between said load and said output diode and effective to provide a first signal representative of the voltage applied to said load;
   second voltage indicating means connected between said power switching circuit and said output diode and effective to provide a second signal representation of the output voltage of said power switching circuit; and
   switching means connected between said first and second voltage indicating means and operated in response to said first signal having a magnitude larger than said second signal to electrically connect said first voltage indicating means to said second voltage indicating means;
   said comparator being operated in response to said first signal having a magnitude larger than predetermined value to provide a control signal representative of the difference between said first signal and said predetermined value;
   said power switching circuit being operated in response to said control signal to increase its output voltage by a proportionate amount.

2. A control circuit as claimed in claim 1, wherein said first voltage divider is effective to provide said first signal of a magnitude equal to said predetermined value when said voltage applied to said load is applied only by the associated power switching circuit.

3. A control circuit as claimed in claim 1, wherein said first voltage indicating means comprises a first voltage divider.

4. A control circuit as claimed in claim 1, wherein said second voltage indicating means comprises a second voltage divider.

5. A control circuit as claimed in claim 1, wherein said switching means comprises a diode.

6. A control circuit as claimed in claim 1, wherein said switching means comprises a Schottky diode.

7. A control circuit as claimed in claim 3, wherein said first voltage divider comprises first and second series connected resistors effective to provide said first signal at the junction of said first and second resistors.

8. A control circuit as claimed in claim 4, wherein said second voltage divider comprises third and fourth series connected resistors effective to provide said second signal at the junction of said third and fourth resistors.

9. A control circuit as claimed in claim 7, wherein said second voltage divider comprises third and fourth series connected resistors effective to provide said second signal at the junction of said third and fourth resistors.

10. A control circuit as claimed in claim 9, wherein said switching means comprises a diode connected between the junction of said first and second resistors and the junction of said third and fourth resistors.

11. A control circuit as claimed in claim 9, wherein said switching means comprises a Schottky diode connected between the junction of said first and second resistors and the junction of said third and fourth resistors.

* * * * *